United States Patent

[11] 3,610,954

[72] Inventor Ronald L. Treadway
Scottsdale, Ariz.

[21] Appl. No. 88,905
[22] Filed Nov. 12, 1970
[45] Patented Oct. 5, 1971
[73] Assignee Motorola, Inc.
Franklin Park, Ill.

[54] PHASE COMPARATOR USING LOGIC GATES
7 Claims, 5 Drawing Figs.

[52] U.S. Cl. .......... 307/232, 307/215, 328/133, 307/233
[51] Int. Cl. .......... H03d 13/00
[50] Field of Search .......... 328/133, 134; 307/232, 215, 233

[56] References Cited

UNITED STATES PATENTS

| | | | |
|---|---|---|---|
| 2,985,773 | 5/1961 | Dobbie | 307/215 X |
| 3,430,148 | 2/1969 | Miki | 328/133 |
| 3,482,132 | 12/1969 | Emde | 307/232 X |
| 3,521,172 | 7/1970 | Harmon | 328/133 |

*Primary Examiner*—John S. Heyman
*Attorney*—Mueller & Aichele

ABSTRACT: A digital frequency/phase detector employs a plurality of NAND gates interconnected to respond to changes in logic level of two input signals, the frequency/phase of which is to be compared. The detector is responsive to changes in the trailing edges of the input waveforms and produces outputs that are related to the repetition rate and relative phase of the inputs. The duty cycle of the input waveforms is unimportant since the circuit responds only to the trailing edge transitions in the input signal; and when the input signals are of the same frequency and are in phase, the output of the phase detector is a constant DC level.

Inventor
RONALD L. TREADWAY

BY

Mueller & Aichele
ATTYS.

Inventor
RONALD L. TREADWAY
BY
Mueller & Aichele
ATTYS.

PHASE COMPARATOR USING LOGIC GATES

BACKGROUND OF THE INVENTION

Phase comparator or phase detector circuits are used in a large number of applications in which it is necessary to determine the relative phase difference between two input signals. Many applications utilize a feedback or servo system for locking the phase and frequency of one input to the phase and frequency of the other input which constitutes the reference signal in the system.

In order to overcome the shortcomings of analog phase detectors which provide sinusoidal outputs representative of the relative phase angle between two input sinusoidal waveforms, digital phase comparators utilizing flip-flops and multivibrators in conjunction with logic gates have been developed for producing outputs which are rectangular waves, the duty cycles of which or the relative durations of the upper and lower portions of which, are representative of the phase differences between the input signals. Some digital prior systems provide an output signal which is a square wave at twice the reference frequency for the "in-phase" condition. This necessitates substantial filtering in order to remove the AC components from the output signal waveform to obtain the desired DC level or component representative of the input signal comparison.

Digital phase comparators using a combination of bistable and logic elements have been developed which compare the leading edge of one signal with the trailing edge of the other signal to develop a rectangular output, with the width of the output pulses being proportional to the degree of phase difference. Because of the necessity for comparing the leading edges of one signal with the trailing edges of the other signal, such a digital phase detector is duty cycle-sensitive and for reliable operation must have input signals with 50 percent duty cycles.

Other digital phase comparators have been developed requiring monostable multivibrators responsive to the input signals for generating control pulses, which then are utilized to provide detection of the relative phase of occurrence of the control pulses derived from each of the input signals. Although a circuit of this type has been developed which provides a flat or steady DC level for an in-phase condition of the two input signals, the circuit is relatively complex because of the requirement for the multivibrators to provide the control pulses supplied to the comparison portion of the circuit.

It is desirable to provide a phase/frequency detector or comparator circuit which provides a zero or stable DC output level for an in-phase condition, which is not dependent upon the relative duty cycles of the input signals, and which may be readily implemented in a simple logic form capable of realization in an integrated circuit configuration.

SUMMARY OF THE INVENTION

It is an object of this invention to provide an improved phase detector circuit.

It is an additional object of this invention to detect the phase and/or frequency difference between two input signals in a digital phase comparator using coincidence gates as the logic elements thereof.

It is a further object of this invention to compare the phase of two input signals in a digital phase comparator which compares corresponding signal level transitions in the input signals so that the comparator is not affected by differences in the duty cycles of the input signals.

It is yet another object of this invention to provide a digital phase/frequency comparator circuit in the form of a plurality of logic gates, all of the same type, so that the comparator circuit may be readily implemented either in discrete or integrated circuit form.

In accordance with a preferred embodiment of this invention, first and second input coincidence gates have a first input of each gate supplied with a different one of two input signals, the phase and and/or frequency of which is to be compared. The outputs of each of these input gates are connected to corresponding inputs of first and second output coincidence gates, the outputs of which are connected back to the second input of the first and second input coincidence gates, respectively.

For controlling the operation of the logic system, a first pair of cross-coupled control coincidence gates are used, each control gate having first and second inputs and an output. The outputs of each of these control gates of the pair. The second input of one of the control gates receives the output of the first input coincidence gate, and the output of that one of the control gates also is supplied to one of three inputs to the first output coincidence gate. A second pair of cross-coupled control coincidence gates is provided and these gates are interconnected in the same manner as the first pair of control gates, with the second input of one of the gates of the second pair being connected to the output of the second input coincidence gate and the output of that one of the control gates of the second pair is connected to a second input of the second output gate.

The circuit is completed by a final control coincidence gate having four inputs which are obtained from each of the aforementioned inputs supplied to both of the first and second output gates. The output of this final control coincidence gate then is supplied as a third input to both of the output coincidence gates and is supplied to the second inputs of the other one of the gates in each of the first and second pairs of cross-coupled coincidence gates.

When all of the coincidence gates used in the comparator circuit are of the same type, the circuit is responsive to the same signal transitions (i.e. the negative transitions for a NAND gate logic circuit) to effect the changing of states of the various gates used in the circuit. When one of the input signals has a higher frequency than the other, the corresponding output gate provides a pulse output which is repetitive at the lower frequency with the other output gate providing a constant DC level output. When both of the input signal frequencies are equal but differ in phase, the pulse width of one of the outputs is equal to the phase difference and occurs at the input frequency rate, while the other output is a constant DC level. The particular output providing the varying output signal depends upon which of the input signals of equal frequency and in phase, both of the output signals obtained from the output gates are at the same constant DC level.

DETAILED DESCRIPTION

Figure 1:
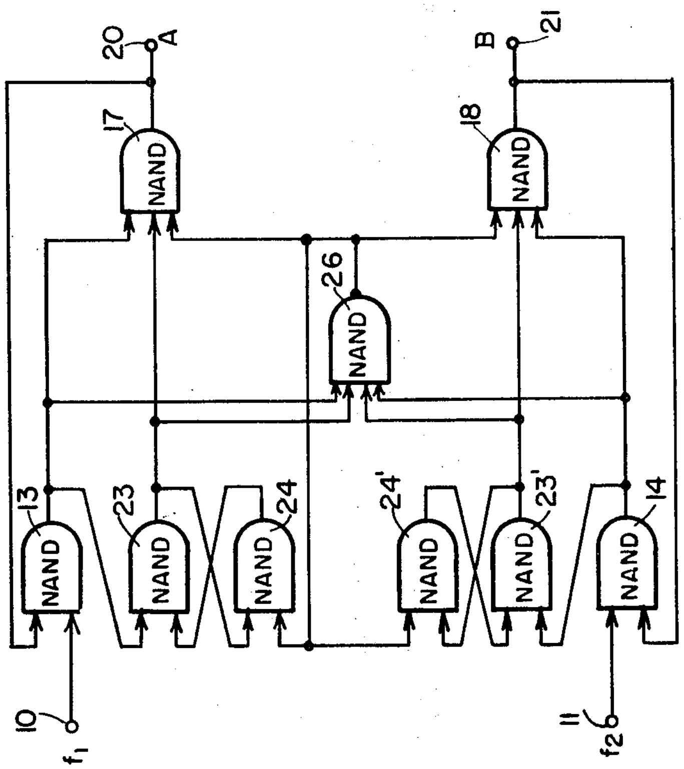
FIG. 1 is a logic diagram of a preferred embodiment of the invention.

Referring now to the drawing, there is shown in FIG. 1 a frequency/phase detector or comparator circuit using NAND gate logic as a digital frequency/phase detector, with the inputs responding to changes in the logic level to provide an output which is related to the repetition rate and relative phase of a pair of input signals.

The input signals, the phase and/or frequency of which is to be compared, are in the form of rectangular signal waveforms and are applied to first and second input terminals 10 and 11, respectively, with these input signals being identified as $f_1$ and $f_2$, respectively. The input signals then are coupled from the terminals 10 and 11 to inputs of first and second input NAND gates 13 and 14, respectively. The outputs of the NAND-gates 13 and 14 are coupled to first inputs of a pair of output NAND-gates 17 and 18, respectively, with the outputs of the NAND gates 17 and 18 being coupled back to second inputs of the NAND gates 13 and 14, respectively. The outputs of the NAND gates 17 and 18 have been labeled A and B and are applied to output terminals 20 and 21, with the signal waveforms on these terminals being indicated by the waveforms A and B in FIG. 3.

Figure 3:
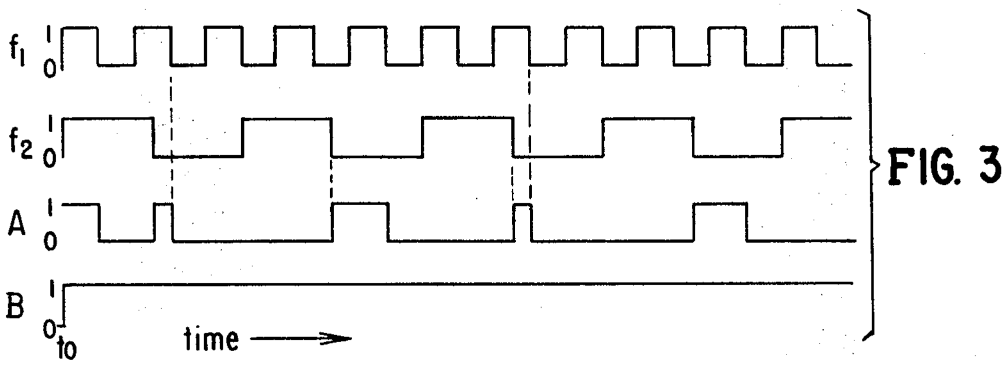
FIGS. 3, 4 and 5 are waveforms illustrating the operation of the circuit shown in FIG. 1 under different conditions.

Initially assume that the signal conditions shown in FIG. 3 exist with $f_1$ being of higher frequency than the signal $f_2$. At time $t_o$, the inputs supplied to both of the NAND-gates 13 and 14 from the outputs of the NAND-gates 17 and 18 are high (indicated as "1" in FIG. 3) and the initial condition of both of the input waveforms $f_1$ and $f_2$ also is high. This then causes the outputs of the NAND-gates 13 and 14 to be low or "0." The low output from the NAND-gate 13 is connected to a first one of the two inputs of a control NAND-gate 23, which is interconnected as part of a pair of cross-coupled control gates including another NAND-gate 24, with the outputs of the NAND-gates 23 and 24 each being coupled back to the second input of the other of the gates in the cross-coupled pair. With a low input being applied from the NAND-gate 13 to the NAND-gate 23, the output of the NAND-gate 23, which is applied to the NAND gate 24, is high at this time. The output of the NAND-gate 23 also is supplied as one of the three inputs to the NAND-gate 17 and is connected as one of four inputs to a further control NAND-gate 26. The output of the gate 26 constitutes the third input to the NAND-gates 17 and 18 and the first input to the NAND-gate 24.

Two of the four inputs to the NAND-gate 26 are obtained from the outputs of the NAND-gates 13 and 14, and these inputs are both low at time $t_o$, so that the output of the NAND-gate 26 is high. This causes the output of the NAND-gate 24 to be low since its other input is high at this time, as previously described.

Connected to the output of the NAND-gate 14 is a second pair of control coincidence gates 23' and 24' which are interconnected in the same manner as the gates 23 and 24 and which operate in the same manner as the gates 23 and 24. The output from the NAND-gate 23' is coupled to an input of the output NAND-gate 18 and to the fourth input of the NAND-gate 26 in a manner similar to the output connections from the NAND-gate 23, to the gates 17 and 26. It can be seen from an examination of FIG. 1, that the circuits interconnecting the input terminal 10 and the output terminal 20 and interconnecting the input terminal 11 and the output terminal 21 are symmetrical and are interconnected by the control NAND-gate 26.

So long as both of the input signals $f_1 f_2$ remain high or at a "1" level, the set of conditions which has been established above continues. As soon as the signal $f_1$ however, undergoes a positive-to-negative pulse transition, as indicated in FIG. 3, the output of the NAND-gate 13 becomes high, forcing the output of the NAND-gate 17 to become low, since the other two inputs to the NAND-gate 17 obtained from the gates 23 and the gate 26 are high at this time and remain high. As a consequence, the first negative-going transition in the output signal waveform A shown in FIG. 3 takes place. No change in the output of the NAND-gate 18 takes place, however, since none of the inputs to that gate have changed at this time.

When the input signal applied to terminal 10 becomes high again, the NAND-gate 13 does not change its output since the output of the NAND-gate 17 applied to the other input of the NAND-gate 13 is low and continues to cause the output of the NAND-gate 13 to be held high. Thus, no change in the outputs from the NAND-gates 17 and 18 is effected upon initiation of the second full cycle of operation of the input signal $f_1$ as illustrated in FIG. 3.

During the time that the input signal $f_1$ is in the first half of its second cycle of operation, however, the first high-to-low or negative-going pulse transition in the input signal $f_2$ occurs, as shown in FIG. 3. This causes the output of the NAND-gate 14 to become high, which at this time results in all of the inputs to the NAND-gate 26 being high; so that its output becomes low. As a result, the output of the NAND-gate 18 remains high, even though the input to the NAND-gate 18 applied from the NAND-gate 14 has changed from a low to a high condition. Thus, no change in the output B applied to the terminal 21 is effected. The output of the NAND-gate 17, however, does undergo a change since the low output from the NAND-gate 26, applied to the input of the NAND-gate 17, once again causes the output of the NAND-gate 17 to become high, as indicated in waveform A of FIG. 3.

When the output of the NAND-gate 26 goes low, as described above, the output of the NAND-gate 24' is high and combines at the input of the NAND-gate 23' with the high output from the NAND-gate 14 to force the output of the NAND-gate 23' to be low. As a result, the output of the NAND gate 18 remains high and the output of the NAND gate 26 becomes high.

It can be seen that the timer interval between the point when the waveform A first went from a high-to-low condition to the time when it again went from a low-to-high condition corresponds to the time interval between the first negative-going transition of the waveform $f_1$. With the second input to the NAND-gate 13 once again becoming high, both inputs to the NAND-gate 13 are high; so that its output becomes low, forcing the outputs of the NAND-gates 23 and 26 and 17 to be high. This causes the output of the NAND-gate 24 once again to become low.

Continued tracing of the signal waveforms shown in FIG. 3, and noting their affect on the operation of the logic circuit shown in FIG. 1, illustrates that the logic circuit of FIG. 1 produces the output waveforms A and B when supplied with input signals $f_1$ and $f_2$ shown in FIG. 3. So long as the input frequency $f_1$ is greater than the frequency of the signal $f_2$, that is when the signal $f_1$ has more negative transitions per unit of time than the signal $f_2$, the relative output conditions at the output terminals 20 and 21 as indicated by waveforms A and B of FIG. 3 exist. For this set of input signal conditions, no change takes place in output B which remains a high or binary "1" output. On the contrary, the output signal A applied to the terminal 20 from the NAND-gate 17 repeats at the lower frequency $f_2$ of the two input signals, with the leading edge or low-to-high ("0" to "1") signals transitions coinciding with the negative transitions of the input signal waveform $f_2$. It is noted that an uneven duty cycle is produced by the waveform A, because of the fact that the input signals $f_1$ and $f_2$ are not harmonic signals.

If the signals $f_1$ were reversed that is if the waveform illustrating signal $f_1$ were applied to the input terminal 11 and if the waveform shown for $f_2$ in FIG. 3 were applied to the input terminal 10, the output conditions would be exactly reversed. The waveform A then would be a steady "1" or high level, and with the waveform B would vary in the same manner as indicated for waveform A in FIG. 3. This result is obtained due to the symmetry of the circuit, so that it may be readily ascertained from the nature of the output signals A and B which of the two input signals is of the higher frequency.

Figure 4:
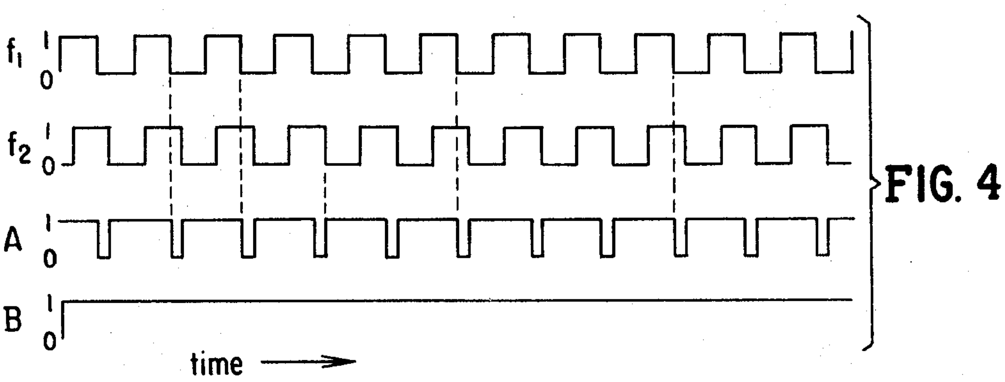

Referring now to FIG. 4, there is shown a different set of operating conditions for input signals $f_1$ and $f_2$ of the same frequency, but with the input signal $f_1$ leading the signal $f_2$ of the same frequency, but with the input signal $f_1$ leading the signal $f_2$ in phase. When signals of this type are applied to the input terminals 10 and 11, the operation of the circuits similar to that described above in conjunction with FIG. 3. The output of the NAND-gate 18, illustrated by waveform B in FIG. 4, continues to remain a constant high or "1" level, and the output of the NAND-gate 17, waveform A, repeats at the frequency of the input signals $f_1$ and $f_2$. The pulse width of the low of "0" condition of the waveform A is equal to the phase difference of the input signals $f_1$ and $f_1$. The operation of the gate circuits is the same for the input signals $f_1$ and $f_1$ illustrated in FIG. 4 as it is for the input signals $f_1$ and $f_2$ illustrated in FIG. 3. If the phase of the input signal $f_2$ leads that of $f_1$, the outputs A and B shown in FIG. 4 would be reversed.

In conjunction with the foregoing descriptions of the input signals illustrated in FIGS. 3 and 4, it should be noted that the duty cycles of the input waveforms are unimportant since the circuit responds only to the negative transitions in the waveforms $f_1$ and $f_2$ have been illustrated as 50 percent duty cycles, but it is readily apparent from an examination of the manner in which the waveform A is reproduced from only the negative transitions of the input signals $f_1$ and $f_2$, that this duty cycle could be asymmetrical for either or both of the input signals $f_1$ and $f_2$. As a consequence, when the circuit shown in FIG. 1 is used in a servo system or a system utilizing a feedback loop accurate signal-shaping of the input signal obtained obtained for comparison with a reference signal is not necessary, thereby removing some stringent requirements on the feedback circuitry which exist when a phase/frequency comparator circuit is sensitive to variations in duty cycle.

Figure 2:
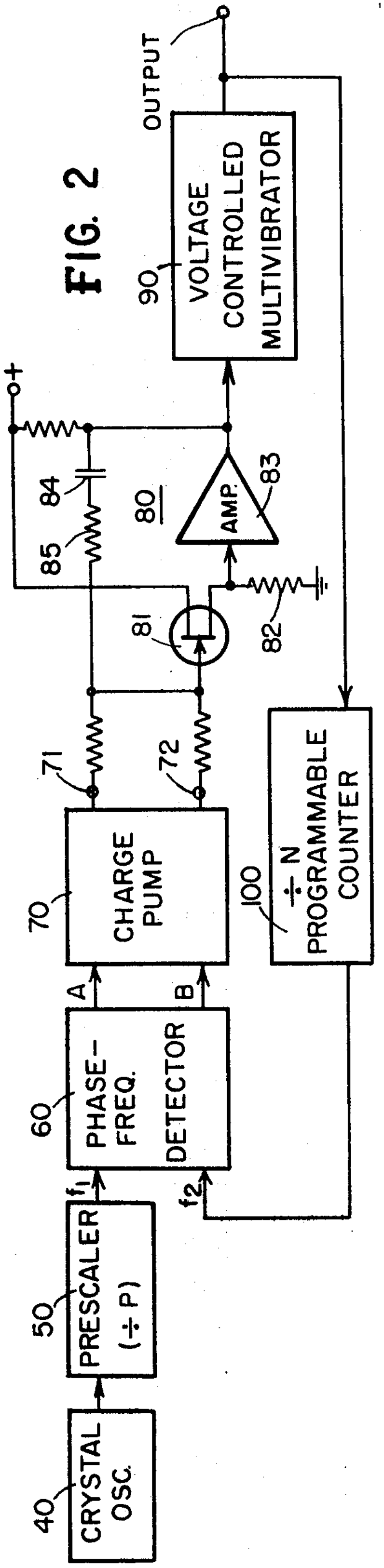
FIG. 2 is a block diagram of a phase-locked frequency synthesizer circuit illustrating one manner in which the circuit of FIG. 1 may be used.

Referring now to FIG. 2, there is shown a typical circuit in which the frequency/phase detector of FIG. 1 may be utilized. The circuit shown in FIG. 2 is a closed loop control system typical of a frequency synthesizer where the output frequency is a multiple of the input or reference frequency applied to the phase detector. The reference signal for the circuit shown in FIG. 2 may be obtained from a stable source, such as a crystal oscillator 40, with this signal being applied through a prescaler circuit 50 to provide an adjustable channel spacing for the frequency synthesizer. By varying the prescaling division factor, different reference frequencies may be applied from the output of the prescaler circuit 50 to the reference input of the phase frequency detector 60, which is of the type shown in FIG. 1, with the output of the prescaler being applied to the input terminal 10 of the circuit, as indicated in FIG. 1.

The two outputs of the phase/frequency detector 60 then are applied to a charge pump circuit 70, which may be of a conventional type and which converts the outputs of the phase detector circuit 60 to fixed amplitude positive and negative pulses at a pair of outputs 71 and 72, respectively. These pulses then are applied to a lag-lead active filter circuit 80 which provides a DC control voltage proportional to the phase error of the two input signals applied to the inputs of phase/frequency detector 60. This DC control voltage then is applied to a voltage-controlled multivibrator circuit 90 to control the operation frequency thereof, with the output of the multivibrator 90 being the desired output from the frequency synthesizer circuit.

In order to lock the output signal of the voltage-controlled multivibrator in frequency and phase with the output of the prescaler circuit 50, a feedback loop is provided from the output of the multivibrator 90 through a divide-by-N programmable counter circuit 100, the output of which constitutes the variable signal input to the frequency phase detector circuit 60. This signal from the counter 100 corresponds to the input signal $f_2$ applied to terminal 11 of FIG. 1. If the divide-by-N programmable counter were five decades of programmable divide, for example, and the voltage-controlled multivibrator 90 has a tuning range of 10 to 1 and the input reference to the detector 60 is 100 Hertz, the resulting output frequency can be programmed from 1 megahertz to 9.9999 megahertz in 100 Hertz increments.

The output A of the detector 60 is applied to the charge pump 70 which typically couples this output to the terminal 71 through a diode which pulls current from the filter 80 through an input resistor coupled to the terminal 71. The other output B of the detector 60 is coupled to the terminal 72 of the charge pump 70 through a circuit which is substantially an emitter-follower network, with each of these outputs being applied through input-coupling resistors to the gate of a field-effect transistor 81 in the active filter circuit 80. The source of the field-effect transistor is connected with a source of positive operating potential and the drain of the transistor 81 is connected through a drain resistor 82 to ground, and also is coupled to the input of an amplifier circuit 83. The amplifier 83 preferably is in the form of FIG. 5, Darlington amplifier and provides the control voltage to the multivibrator circuit 90. A filter network in the form of a capacitor 84 connected in series with a resistor 85 is connected from the output of the amplifier 83 back to the input at the gate of the transistor 81 in order to stabilize the output voltage supplied to the voltage-controlled multivibrator 90, with the amplifier being driven from a center voltage obtained from the two outputs of the charge pump as applied to the terminals 71 and 72.

Figure 5:
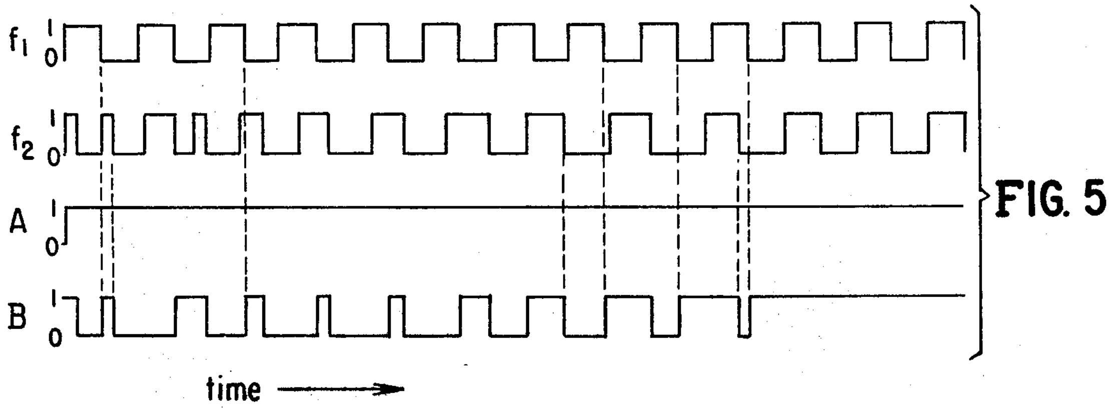

Referring now to FIG. 5, there is shown a set of typical waveforms which occur in the operation of the circuit shown in FIG. 2, utilizing a phase/frequency detector for the detector 60 which is of the type shown in FIG. 1. For the initial set of cooperating conditions of the signals applied to the circuit shown in FIG. 1 in conjunction with the waveforms of FIG. 5, it should be noted that the frequency $f_1$, which is the reference frequency obtained from the prescaler circuit 50, is of a lower frequency than the input signal frequency $f_2$ obtained from the output of the programmable counter 100. As a consequence, the output from the NAND NAND-gate 17, indicated as waveform A in FIG. 5, is a constant high or "1" output, which is the reverse of signal conditions described previously in conjunction with FIGS. 3 and 4. This result is obtained, however, due to the symmetry of the circuit shown in FIG. 1; so that whenever the signal $f_2$ is of a higher frequency then the signal $f_1$, the output A of the NAND-gate 17 is constant and when the input signal $f_1$ is of a higher frequency or leading in phase the signal $f_2$, the output A of the NAND-gate 18 is a constant "1" output, as described previously.

With the waveforms $f_1$ and $f_2$, as shown in FIG. 5, being applied to the comparator circuit shown in FIG. 1, the first negative transition occurs in the waveform $f_2$. This in turn causes the output of the NAND-gate 14 to become high, forcing the output of the NAND-gate 18 to become low to produce the first high-to-low or negative-going transition in the output waveform B. Subsequently, the first negative-going transition in the waveform $f_1$ occurs to reverse the output of the NAND-gate 18, forcing it to go high through the operation of the NAND-gate 26, which is caused to have a low output at the time that the output of the NAND-gate 13 is forced high by the first negative-going transition of the input signal waveform $f_1$. The operation of the control NAND-gates 23, 24 and 23', 24' and 26 is the same as described previously in conjunction with the waveforms shown in FIGS. 3 and 4 and will not be repeated here.

The variations in the waveform B as compared with the waveform A applied to the charge pump circuit 70 cause variations in the output signal level of the output 71 of the charge pump 70 as compared with the output 72. The charge pump outputs are filtered by the filter circuit 80 and are applied as a control voltage to the multivibrator 90 to change its frequency of operation. This results in a variation in the frequency of the signal $f_2$ obtained from the output of the programmable counter 100, as indicated in FIG. 5. As this frequency varies, the waveform B changes in its duty cycle; and the signal $f_2$ is reduced in frequency to correspond more closely with the frequency of the signal $f_1$.

It is possible that when the frequency of the signal $f_2$ is so reduced to substantially equal the signal of the frequency $f_1$ that the two signals could be 180° out-of-phase, which condition is illustrated in the central portion of the signal waveforms $f_1$ and $f_2$ shown in FIG. 5. This then produces a signal at the output B which has a substantially 50 percent duty cycle, and results in an additional control potential applied to the voltage-controlled multivibrator 90 to even further reduce the frequency of the signal $f_2$ below that of the signal $f_1$, as indicated in the waveforms $f_1$ and $f_2$ of FIG. 5. This reduction occurs until the trailing edges of the input signals $f_1$ and $f_2$ coincide, at which time both of the outputs from the NAND-gates 17 and 18, and indicated as waveforms A and B, in FIG. 5 attain a "1" or high condition, at which point these outputs remain so long as the two inputs signals $f_1$ and $f_2$ are of the same frequency and are in-phase.

The waveforms shown in FIG. 5 have been obtained from actually observed waveforms of a frequency synthesizer connected as shown in FIG. 2 and utilizing the comparator circuit shown in FIG. 1. The "hunting" which is indicated in FIG. 5 may actually occur, but the locking in of the frequency $f_2$ to that of the frequency $f_1$ also can occur without causing the frequency $f_2$ to momentarily drop below that of $f_1$. This condition only is obtained when the two signals are pulled into the same frequency but substantially 180° out-of-phase as indicated in the middle portion of the waveforms of FIG. 5.

In conjunction with the operation of the circuit shown in FIG. 2, it is important to note that the system is a type-two servo system, i.e. the phase error at the phase detector circuit 60 is zero when the system is locked in frequency and phase. Because both of the outputs from the detector circuit 60 are stable or constant DC levels for an in-phase and in-frequency condition of operation, a far less severe filtering requirement at the output is necessary since there is no pumping action of a signal to create a ripple which must be filtered out in order to derive the control voltage for the voltage controlled multivibrator 90 for the in-phase condition.

Since this system is a type-two servosystem, the reference frequency modulation of the voltage controlled oscillator control voltage is substantially minimized due to the flat output from both of the outputs of the phase/frequency detector. The reference frequency ripple has been observed as greater than 65 db. down from the wanted output of the voltage-controlled multivibrator 90 in a typical application.

Since the system locks only on the trailing edges of the pulses applied to the two inputs of the phase/frequency detector, it is unnecessary to rely on the duty cycle of the input signals in any way for obtaining the phase and frequency synchronization. This feature is especially important when a large division chain is used in the programmable counter 100 since with chains involving a great amount of frequency division, it is nearly impossible to obtain a perfect square wave. In systems which are duty cycle sensitive it is necessary, however, to have a perfect square wave in order to obtain proper operation of the system. It is apparent that by changing the prescaling factor of the prescaler circuit 50, it is possible to cause an adjustable channel spacing to be obtained from the prescaler circuit may be varied in multiples of the reference frequency by changes in the divide-by-N chain of the programmable counter multivibrator 90 to the variable signal input of the detector circuit 60.

Although the foregoing description has been specifically directed to a NAND gate configuration, it should be noted that NOR gates may be substituted directly for the NAND gates. The wiring interconnections would be the same with inverted outputs being obtained from the system for applications requiring such inverted outputs.

It also should be noted that the various sets of cross-coupled gates shown in FIG. 1 could be replaced with bistable multivibrators if desired. For example, the gates 23 and 24 could be replaced with a bistable multivibrator having set and reset inputs and normal and inverted outputs with only the normal output being connected to the remaining elements of the circuit. Similarly, the gates 13 and 17 could be replaced with a bistable multivibrator having a set and two reset inputs and normal and inverted outputs. The normal output of this latter multivibrator then would be applied to the set input of the first-mentioned multivibrator and the input of the gate 26. The inverted output of the latter multivibrator would correspond to output A. The output of the gate 26 would be a reset output for both multivibrators, input signals on 10 would be a set input and the output of the first multivibrators would be a reset input for the latter. The gates 23', 24' and 14, 18 could be similarly replaced. Whenever mention is made of these cross-coupled gates, it is intended to cover the two halves of a bistable multivibrator as well.

I claim:

1. A phase detector for producing an output signal indicative of the phase difference between first and second periodic signals including in combination:

first and second input coincidence gates, each having first and second inputs and an output, with the first inputs of said gates being supplied with said first and second periodic signals, respectively;

first and second output coincidence gates, each having an output, the outputs of the first and second output gates coupled respectively with the second inputs of the first and second input coincidence gates;

first and second control gate means;

means for supplying the outputs of the first and second input gates to the inputs of the first and second output gates and the first and second control gate means, respectively;

third control gate means responsive to the outputs of the first and second input coincidence gates and the first and second control gate means for producing a control output corresponding to a predetermined relationship of the outputs of the input gates and the first and second control gate means;

means coupling the control output of the third control gate means with inputs of the first and second control gate means and inputs of the first and second output coincidence gates;

means coupling the outputs of the first and second control gate means with corresponding inputs of the first and second output gates, respectively, the outputs of the first and second output gates being at a predetermined steady DC level with the phase difference between the first and second periodic signals being zero, and the output of one of said output coincidence gates being in the form of rectangular pulses indicative of the phase difference between said first and second input signals, when the phase difference between said input signals is other than zero, or one of said input signals is of the higher frequency than the other.

2. The combination according to claim 1 wherein the first control gate means includes a first pair of cross-coupled coincidence gate means, each having first and second inputs and having an output coupled to the first input of the other, with the second input of one of the first pair of cross-coupled coincidence gate means being coupled with the output of the first input coincidence gate, and the second input of the other of the first pair of cross-coupled coincidence gate means being coupled with the output of the third control gate means; the second control gate means includes a second pair of cross-coupled coincidence gates each having first and second inputs and having an output coupled with the first input of the other, with the second input of one of the second pair of cross-coupled coincidence gates being coupled with the output of the second input coincidence gate, and the second input of the other of the second pair of cross-coupled coincidence gates being coupled with the output of the third control gate means; and the outputs of said ones of said first and second pairs of cross-coupled coincidence gates being coupled, respectively, to corresponding inputs of the first and second output coincidence gate.

3. The combination according to claim 2 wherein the third control gate is a coincidence gate having four inputs coupled, respectively, with the outputs of the first and second input coincidence gates and the outputs of said ones of the first and second pairs of cross-coupled coincidence gates; and the output coincidence gates each have three inputs coupled, respectively, with the outputs of the first and second input coincidence gates, the outputs of said ones of the first and second pairs of the cross-coupled coincidence gates, and the control output of the third control coincidence gate.

4. The combination according to claim 3 wherein all of the coincidence gates are of the same type.

5. A circuit for producing an output signal respective of the phase/frequency difference between first and second periodic signals, each periodic signal having at least first and second voltage levels and a leading edge defining a transition from the first to the second voltage level and a trailing edge defining a transition from the second to the first voltage level, the phase/frequency circuit including in combination:

first and second input coincidence gates each having an output and first and second inputs;

means for supplying the first and second periodic signals to the first inputs of the first and second input coincidence gates, respectively;

first and second output coincidence gates each having an output and first, second, and third inputs, with the first inputs thereof being coupled with the outputs of the first and second input coincidence gates, respectively;

first and second control coincidence gates, each having an output and first and second inputs, with the output of the first control gate being coupled with the first input of the second control gate means, and the output of the second control gate being coupled with the first input of the first control gate, and the second input of the first control gate being coupled with the output of the first input coincidence gate;

third and fourth control coincidence gates, each having an output and first and second inputs, with the output of the third control gate being connected with the first input of the fourth control gate, and the output of the fourth control gate being connected with the first input of the third control gate, the second input of the third control gate being coupled with the output of the second input coincidence gate;

a fifth control coincidence gate having an output and four inputs, the first and second inputs to which are coupled with the outputs of the first and second input coincidence gates, respectively, and the third and fourth inputs to which are connected with the outputs of the first and third control gates, respectively;

means coupling the outputs of the first and third control gates with the second inputs of the first and second output coincidence gates, respectively; and means coupling the output of the fifth control coincidence gate with the third inputs of the first and second output coincidence gates and with the second inputs of the second and fourth control gates.

6. The combination according to claim 5 wherein all of said coincidence gates are of the same type.

7. The combination according to claim 6 wherein the coincidence gates are NAND gates, so that the first and second output gates each provide a predetermined steady voltage level when the phase/frequency difference between said first and second periodic signals is zero, and one of said output gates produces rectangular pulses of a width proportional to the phase difference of the trailing edges of the first and second periodic signals when the first periodic signal leads the second periodic signal or is of higher frequency than the second periodic signal, and the other output coincidence gate produces rectangular pulses of a width proportional to the phase difference between the trailing edges of the first and second periodic signals when the second periodic signal leads the first periodic signal or is of higher frequency than the first periodic signal.